(Model.)

4 Sheets—Sheet 1.

A. VIVARTTAS.
TOOTH FOR GEARING.

No. 274,861.

Patented Mar. 27, 1883.

Witnesses
Edward Hughes
Augustus Böttger

Inventor:
Aloha Vivarttas (Model.)

A. VIVARTTAS.
TOOTH FOR GEARING.

No. 274,861. Patented Mar. 27, 1883.

Witnesses
Edward Hughes
Augustus Bittger

Inventor
Aloha Vivarttas (Model.)

A. VIVARTTAS.
TOOTH FOR GEARING.

No. 274,861.

4 Sheets—Sheet 3.

Patented Mar. 27, 1883.

Witnesses
Edward Hughes
Augustin Dottger

Inventor
Aloha Vivarttas (Model.)
A. VIVARTTAS.
TOOTH FOR GEARING.
No. 274,861. Patented Mar. 27, 1883.
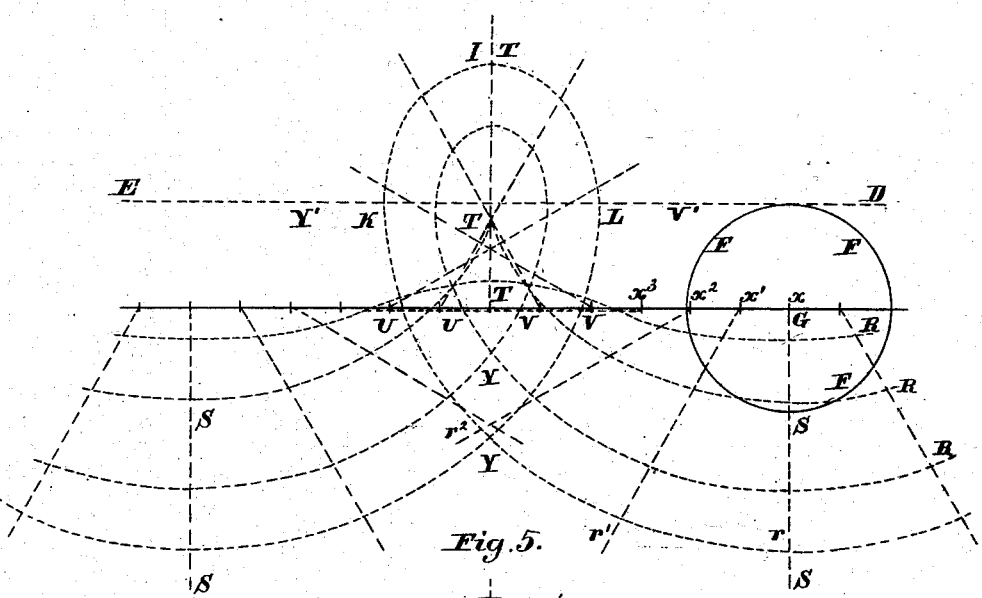
Fig. 4.
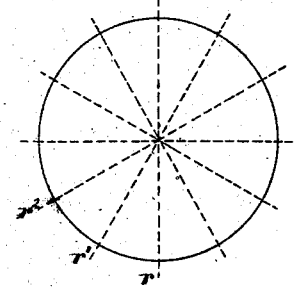
Fig. 5.
Fig. 6.
Witnesses.
J. Henry Kaiser.
Jas. Greene
Inventor:
A. Vivarttas
per. atty,
James G. Arnold

UNITED STATES PATENT OFFICE.

ALOHA VIVARTTAS, OF WEST HOBOKEN, NEW JERSEY.

TOOTH FOR GEARING.

SPECIFICATION forming part of Letters Patent No. 274,861, dated March 27, 1883.

Application filed August 19, 1882. (Model.)

*To all whom it may concern:*

Be it known that I, ALOHA VIVARTTAS, of West Hoboken, New Jersey, have invented Improvements in the Art of Constructing the Teeth of Gearing, of which the following is a specification.

Figure 1:
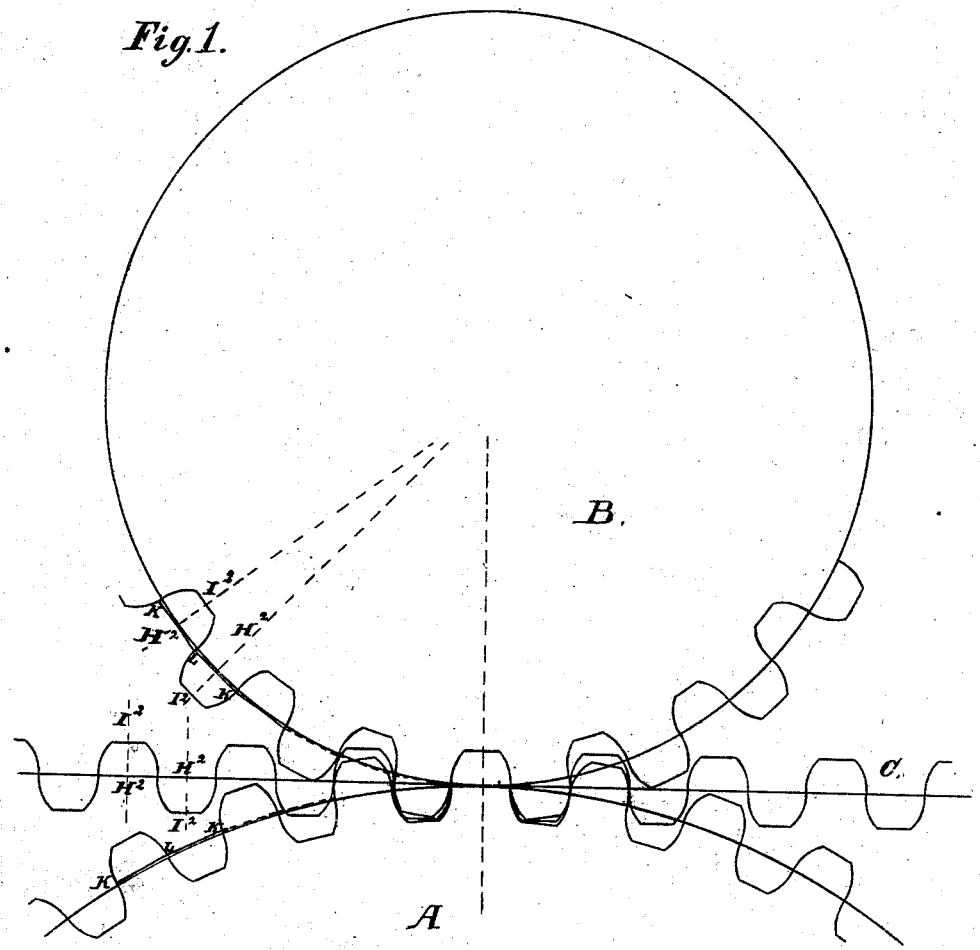
Figure 2:
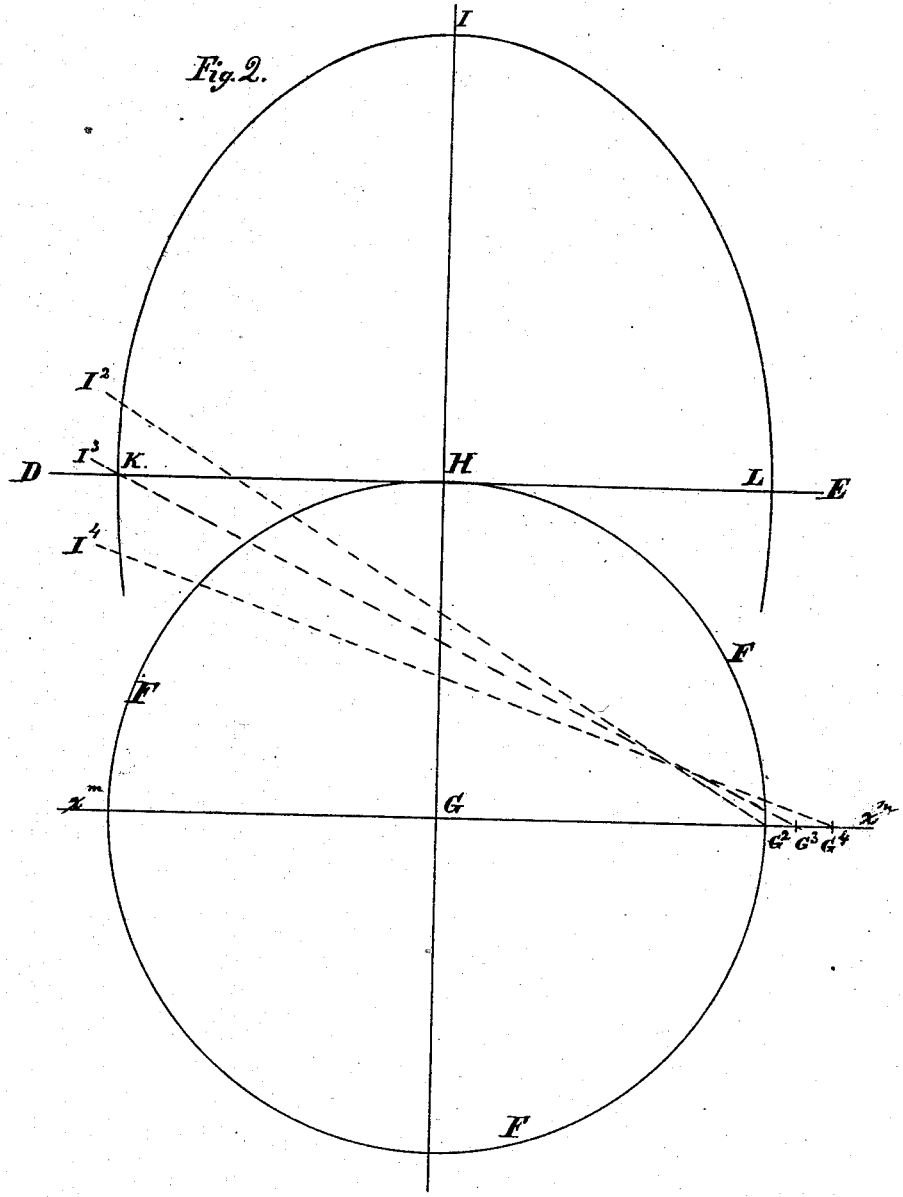
Figure 3:
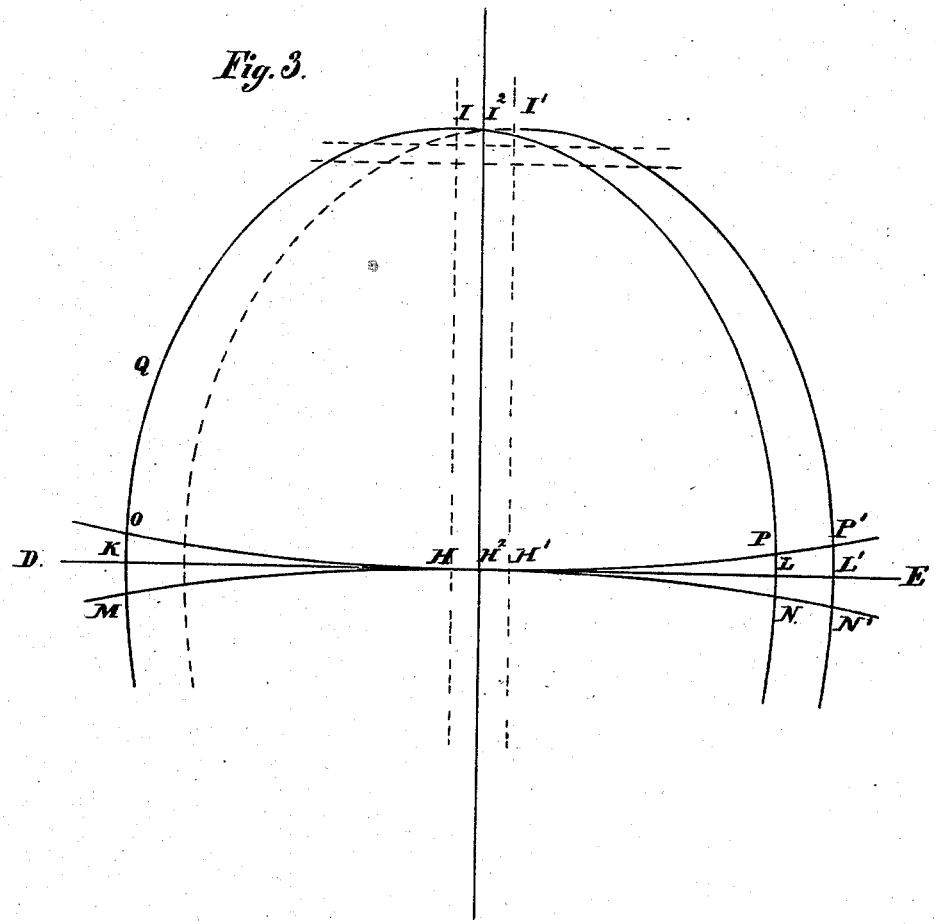

Of the drawings, Figure 1, Sheet 1, illustrates the relation of the teeth of two spur-gear and a rack to run with either. Fig. 2, Sheet 2, illustrates my method of mechanically projecting the curve of contour of the tooth by the use of generating circle and pitch-line. Fig. 3, Sheet 3, illustrates the proportions of the teeth. Fig. 4, Sheet 4, illustrates the cycloidal curves geometrically considered, and Figs. 5 and 6 are some details hereinafter explained.

This invention relates to the form or contour of the teeth and corresponding spaces of gear or cog wheels, and is applicable to all classes of gearing, as racks, spur, bevels, eccentric, elliptic, internal, spiral and worm or screw gear, and segments, either circular or otherwise. All may be made to work within the limits herein described, and a true interchangeable tooth may be made with ease and perfection.

Thus, in the investigation of the natural contour of the teeth of gear, let it be defined that the contour required must be that of a tooth interchangeable. Thus the wheel A, Sheet 1, of any number of teeth—as, for example, thirty-six—must run with another of the same number, or with B, of, for example, twenty teeth, or with any larger number, to the straight rack C, which may be considered as a wheel of infinite length of radius; and not only must A and B run together, or A and C, but B and C must run equally as well. Such form, if found, is the true standard for general use, the variations therefrom being in cases of wheels of differing materials running together, in worm-gear, or other cases where especial uses preclude the quality of interchangeability, and even in such case the geometric equation of the working-surfaces will agree with the standard.

To analyze the quality of interchangeability and seek some clue to its equation and projection, by the definition given above, it is evident that inasmuch as the teeth of A and the teeth of B both run into the spaces between the teeth of C, therefore the teeth of A and B should be geometrically similar; and as the teeth of A and the teeth of C both run into the spaces between the teeth B, therefore the teeth of A and C should be geometrically similar. Again, as the teeth of B and the teeth of C both run into the spaces between the teeth of A, therefore the teeth of B and the teeth of C should be geometrically similar. Thus, then, it is shown that the teeth of A, B, and C should be geometrically similar. In like manner, if the tooth of A fits the spaces between the teeth of both B and C, and the tooth of B fits the spaces between the teeth of both A and C, and the tooth of C fits the spaces between the teeth of both A and B, then it is shown that not only must the teeth of A, B, and C, but also the spaces between those teeth, be all geometrically similar—that is, in practical operating form. If the wheels A B, instead of having their surfaces in the same plane, are made to project on opposite sides, then a rack for each could run in the same teeth and the working-surfaces of both racks be indicated by C, the teeth of one rack being precisely similar to the spaces of the other. Hence as C is a straight row of teeth and spaces, and when run with either A or B is tangential thereto, and as teeth and spaces of C are similar, then, A and B being run together, an imaginary row of teeth tangential to and running into both A and B would represent the desired form of C. In this case it will be seen that that which is the tooth of C as regards A is the space between two teeth as regards B, and vice versa, while a straight line dividing C longitudinally one-half way between the extremities of its teeth and spaces will leave them similar in form, but alternate in position, and this line is tangent to two imaginary circles—one on A and one on B—which circles touch each other and the straight line on the same point, each circle being half-way between the tops of the teeth and bottoms of the spaces of A B, and also concentric with them, and the sizes of these circles are to each other as the numbers of teeth or spaces in their respective wheels. Therefore these circles are called "pitch-circles," and the straight line is the pitch-line of the rack C. Observe that pitch lines and circles never cross, but only touch, each other. It is evident that the part of the tooth of A that is outside of its pitch-circle performs its labor in, and therefore governs the form of the space between, two teeth, and within the pitch-circle of B, or beyond the pitch-line of C; and in like manner the tooth of B, from pitch-circle outward, works in the space between two teeth of A from pitch-circle inward, or beyond the pitch-line of C. Therefore, if the contour of the tooth proper, or from pitch-line outward, be found, that will be the form for the space from pitch-line inward, and in which it has to run, for which reason the term "tooth" is hereinafter confined to the tooth proper, or from pitch-line outward, and the term "space" to the space proper between the bases of two adjacent teeth and within the pitch-line.

By the definition given above of interchangeability it appears that the proper contour of the tooth would be such that it would not be affected by the curvature (more or less) of the pitch-line on which it stands, and this fact makes the investigation appear hopeless, or at least of a very abstruse character. But it has been shown that the tooth of the straight rack C should be geometrically identical with the tooth of the wheel, of whatever number. Therefore eliminate from the question the whole list of curves agreeing to different sizes of pitch-circles as heretofore used, and limit the search to the straight work of the rack; and as the tooth of the rack will give the spaces in any wheel, and as both tooth and space are similar in both wheel and rack, therefore the search may be still further limited to the one side of the straight pitch-line, or to the tooth only.

Having thus simplified the question by eliminating the curves, as above mentioned, and confining it to a tooth or space upon a straight pitch-line or rack, next comes the question of the relative motion or change of position of the rack and the wheel that runs in it. Note that as the straight pitch-line never works to another straight pitch-line, except in screws, worms, &c., when the conditions are different and do not admit of interchangeability, therefore two straight pitch-lines are not data sufficient to determine the problem. Again, as the straight pitch-line does work with circular ones of all sizes, and as circular ones of all sizes do run with each other, this being the condition of interchangeability, therefore a straight pitch-line with any circular one will supply the data required. Observe that any two circular pitch-lines would furnish these data, but the labor of solving the problem would then be double what it is when working from the straight and circular lines, while the result would be the same. Taking the straight pitch-line D E, Sheet 2, and upon it rolling any circle F F F, it is evident that any point carried by such circle, without changing its position in regard to it, will describe as regards D E some one of the lines belonging to the family of the cycloidæ, and the line followed by the center G will be straight and parallel to E D, it will be the line of the abscissas $x\ x$, while the sum of all the terms $x$ or $m\ x$ will be equal to the circumference of F F F. Next project the radius G H, crossing D E in H, and produce it to I. By the problem the whole of the tooth is without the pitch-circle. Therefore any point in the tooth will be beyond that circle, as I, and will as regards D E describe the curve K I L; but the tooth works only when beyond the line D E, and therefore its motion as regards D E is retrograde. For instance, if F F F roll toward E, G goes toward E, but I traverses some appreciable distance toward D, crossing D E in K, and, on the contrary, when G goes toward D, I goes toward E, crossing D E in L. This limits the tooth to this portion of the curve, and as much on either side thereof as will cover the points K and L, and the same would contain the space. But the circular pitch-line crosses the curve on one side of D E, as at M N, Sheet 3, when the tooth is contained in M I N, or at O P when the space is contained in O I P; but when running, the points N, L, and P, or M, K, and O, in different wheels will be brought together. Therefore it is necessary to so fix the values $x$ and $y$ that the distances O H P, measured on the curve K H L, measured on the straight, and M H N, measured on the curve, are equal for all wheels that run together. This fixes the value of $x$ and $y$ for the standard pure curve, and gives the flanks of the teeth and spaces, as from M to I, which will give the form of any tooth, or from K to I, which will give the form of any space, for as a gear must run either way both flanks must be alike. But it appears that if N be brought to P as the wheels turn, the line H I being inclined to D E, the distance N Q may be more than the distance O P and the tooth be too large to turn out of the space. This is the case with the pure curve when the distances O H P, K H L, and M H N are equal. Hence the pure curve could work only in a case using two straight pitch-lines. But the contour of the flanks having been found, they may be separated to any distance beyond their normal relative positions by dividing the pure curve K I L, Fig. 3, Sheet 3, on the line H I and separating the parts, making H H' as much as K L, divided by the number of teeth in the smallest pinion, when drawing I' P' L' N'; N' Q will be found to be never more than O P', for the double reason that K L is increased in a greater ratio than L Q, as the base is increased faster than the hypotenuse when the perpendicular is not changed, and also because the curves M H N' and O H P' are slightly increased in radius as compared with M H N and O H P; hence the distances M' L' and P' L' are less in proportion to K L' or O P than before. Consequently a tooth of this form on the rack, the pinion mentioned, or a wheel of any number of teeth between them, will turn in and out of the space it fits; or, in other words, this gives the interchangeability sought for. To determine and describe this curve it is proper to have a clear comprehension of the cycloidæ in all their various forms. Take, then, the equation $x \pm$ cosine $r. x \pm$ sine $r=y$, where $y$ is any point in the desired line. Then, if we make $x=o, r$, being carried around through the sines, will complete a circle, as Fig. 5, Sheet 4. Take $r=o$, and $x$, carried to any number of terms, will give a straight line, as Fig. 6, Sheet 4. By the different relative values of $x$ and $r$ true cycloidal lines may be obtained of all the degrees of difference from the circle to the right line, as Fig. 4, Sheet 4. All of these lines will have two maxima or points of extreme distance from the line of abscissa—a major maximum, S, Fig. 4, Sheet 4, and a minor maximum, T, Fig. 4, Sheet 4. All of these lines will have two minima or points of least distance from the line of abscissa—a positive, as U, and a negative, as V, Fig. 4, Sheet 4. The major maximum will be attained when cosine $r$ changes its sign from minus to plus, sine $r$ being then a plus quantity. The minor maximum will be attained when cosine $r$ changes its sign from plus to minus, sine $r$ being then a minus quantity. The positive minimum will be attained when, cosine $r$ being plus, sine $r$ changes its sign from plus to minus. The negative minimum will be attained when, cosine $r$ being minus, sine $r$ changes its sign from minus to plus. In these curves, when the sum of all the terms $x$ is to $r$ as circumference is to radius, or as 6.2832 to 1, the minor maximum becomes as cusp, and the line is commonly known as the "cycloid." In all cases where the sum of all the terms $x$ is to $r$ as more than circumference to radius, or as 6.2832 + $m$ to 1, the line comes under the common name of a "waved" line. The line of abscissa being a curve with the major maximum without, the sum of all of the terms $x$ being to $r$ as the circumference to the radius, the result is the curve known under the name of "epicycloid." The line of the abscissa being a curve with the major maximum within, the sum of all of the terms $x$ being to $r$ as the circumference to the radius, the result is known as the "hypocycloid." When the sum of all the terms $x$ is to $r$ as less than the circumference to the radius, or as 6.2832−M to 1, the curve is what I call a "hypercycloid," and, in addition to its maxima and minima, has a point of intersection with itself, Y, which is made when the terms $x m +$ cosine $r f$ and $x n -$ cosine $r f$ shall, by the natural progression of $x$, have an equal value on the line of abscissa. The term sine $r$ will have the same sign in both cases, whether plus or minus; also, its value in both cases will be the same. This point of intersection may fall anywhere from the major maximum when the curve is a circle to the minor maximum when the curve is a cycloid vulgar. Note, that in all of the cycloidal lines between the straight line and cycloid vulgar or waved lines the movement of the generating-point is always advancing in the same direction as the generating-circle F F, though varying in ratio, but never retrograde; but in all of the cycloidal lines between the cycloid vulgar and circle, or hypercycloids, the movement is always advancing at the major maximum, always retrograde at the minor maximum, and never retrograde at either minimum, but always advancing at the minima up to the circle when the motion at either minimum is perpendicular to the line of abscissa. This retrograde movement of the minor maximum commences when minus sine $r$ bears the ratio to the line of the abscissa for the sum of all four quadrants that the radius bears to the circle, and will continue until, having passed the minor minimum, minus sine $r$ shall again have the same value. This minor maximum, from its retrograde movement and its position as lying beyond the imaginary line D E, whose distance from the line of the abscissa to which it is parallel is to the length of that line as radius to the circumference, is the portion of the hypercycloid especially adapted to the gear-tooth of the mechanic, as described. To project the cycloidæ mechanically, roll any circle upon a right line, D E, the circumference of the circle F F being equal to the length of the line of abscissa for the four quadrants, the center of the circle G traveling in the line of abscissa, assuming any length of radius from the center of the circle to the scribing-point R. Then, if R is placed between the center and circumference of the circle, it will describe a waved line. If R is placed in the circumference of the circle, it will describe a cycloid vulgar. If R is placed without the circle, it will describe a hypercycloid, and the points K L, where R crosses the right line D E, upon which the circle F F is rolled, are the points where the movement of R changes from forward to backward, and vice versa, as stated. In practice it is most convenient to commence the line when both $x$ and $r$ have the plus sign, or at the major maximum. Both $x$ and $r$ have the plus sign for the first quadrant, when $r$ changes its sine, and $x$ has the plus sign and $r$ the minus sign, for the second quadrant, when, $x$ changing its sign, both $x$ and $r$ have the minus sign for the third quadrant, again $r$ changes its sign, and $x$ has the minus sign, $r$ the plus sign for the fourth quadrant, making a complete curve.

In applying the described curve to the gear-tooth of the mechanic, let the number of teeth in any gear be represented by $z$, then will the number of spaces be represented by $z$ also, and the regular polygon of $2z$ sides, which will contain the pitch-circle of that gear, being taken, each side thereof will represent the straight pitch-line K L of a tooth or space. Note, that the word "pitch" is usually considered to mean the length on the pitch-line of a tooth and space, or two K L, because all wheels making a revolution or more must have as many teeth as spaces. But in segments this is not necessary. There the pitch may be figured as K L, which is the best plan in all cases. It is shown above that the measure of K L on the straight pitch-line or side of the polygon and the measures M N′, Fig. 3, Sheet 3, of the tooth and O P′ of the space are equal. Therefore, if the tooth be drawn upon the straight side of the polygon and central thereto, and the curve of contour be continued across that line to the curve of the contained pitch-circle, it will cut that circle in M and N'; and, again, if a space be drawn within and central to the next side of the polygon (it being the same curve of contour) will cut the curve of the contained pitch-circle in O and P'. But K L' and M N' and O P' are equal. Therefore the point M of the tooth and the point O of the adjacent space, being on the same contained pitch-circle, will be identical. Hence there is no space lost or unaccounted for, and the wheels run without excess of tooth or space, and interchange, for $z$ may represent any number of teeth, from the smallest standard pinion, or ten teeth, up to the straight rack.

It is seen that a tangent to the curve of contour at K is perpendicular to the straight pitch-line K L and parallel to the line $H^2 I^2$; hence in the straight rack, when the centers of $H^2 I^2$ of teeth and spaces are all parallel, their curves are tangential to each other, smooth, and without angle. But in the wheel of circular pitch-line the tangents to curves of contour at M and O are not quite parallel to their $H^2 I^2$, or central radii of tooth and space, and are not radial or perpendicular to the curve of the pitch-circle at M or O'; hence the curves of contour will form an angle at M O, which angle is a little less than the angle of the central radii, $H^2 I^2$, of tooth and space, because the tangents at M and O are not quite parallel to their central radii, $H^2 I^2$. Thus in the pinion of ten teeth and ten spaces the angle of the center radii of tooth and space will be eighteen degrees, and the angle of the curves of contour at M O will be a little more than the supplement thereof, of about one hundred and sixty-five degrees. In running two wheels together the angle at the pitch-line of one touches the corresponding angle of the other only as they pass the line drawn from center to center of the wheels, and only at the instant when the labor, which has been performed up to that point by the space of the driver acting upon the tooth of the driven, is transferred to the tooth of the driver to act upon the space of the driven, and at this moment, in the extreme case of the two ten-toothed pinions running together, there will be also two other points of contact—another space of the driver acting upon another tooth of the driven and another tooth of the driver acting upon another space of the driven. As the number of teeth in the wheels is increased, so the number of points of contact increases, while the angle at M O decreases at the same time.

It is evident that as the angle at M O varies with every different number of teeth and spaces in a wheel or of sides to the polygon, while the relation of tooth or space to their respective sides of the polygon remained unchangeable, therefore the only proper method of making gear in practice—whether by hand, as a wooden pattern, or in a cutting-engine—is to work with reference to the polygon described; or as the center line of tooth or space will always bisect its side of the polygon and cut it perpendicularly, and therefore is a radius of the wheel, cut the tooth on its own center radius, and cut the space upon its own center radius. Then, in engine-cut teeth, by making a cutter to finish the space and another cutter to finish the tooth, that single pair of cutters will cut from the ten-toothed pinion all of the numbers up to the straight rack, fine fitting and interchangeable. In common cutting-engines this requires a change from space-cutter to tooth-cutter and a second cut around the gear; but by using a compound head with two arbors that can vary their angles to the work the gear may be cut with but little more than one revolution of the gear.

In pattern-making for cast gear, or in finishing wooden cogs, first make a templet that will fit the tooth and another that will fit the space, and those templets will fit the teeth and spaces of every gear, pinion, or rack that can be made of that dimension of pitch, and the workman, by laying out the center lines and pitch-circle, or by laying out the polygon, as described, can lay his templets to place, scribing the teeth and spaces by them accurately, correctly, and quickly, and as he finishes his teeth and spaces the same templets are his gages to test his work, making the most perfect work with the least labor and in the shortest time.

The strength of the standard tooth, as described, is the extreme allowed by the material of which it is made, for the tooth and space on the pitch-line are equal, and there is no lost space or backlash; also, the form of the spaces, fitting closely to the tooth, leaves the most material possible between the two spaces and carries the line of ultimate breakage to a point from one-third to one-half way from the bottom of the spaces to the pitch-line in cast-iron.

The best proportions for a standard tooth are the true pitch or tooth divided into fifteen parts, taking eight and one-third of these parts for the length of tooth from pitch-line out and eight and two-thirds for depth of space from pitch-line in, leaving a clear space of one-third of a part in running, with pitch-lines agreeing, this clearance being arbitrary and varied by circumstances, being only necessary to prevent clogging by dirt or matter carried in by the gear in motion. The generating-circle for any pitch is found by multiplying that pitch by the number of teeth in the smallest pinion and dividing by the same number plus one, or fractionally expressed thus: Where the smallest pinion has ten teeth the circle is ten-elevenths of the true pitch, or when the smallest has six the circle is six-sevenths of the true pitch, and the best curve for contour of tooth and space is given by a point on the extended radius seven-thirds of that radius from the center, or, as in Fig. 4, Sheet 4, G S′ = ⅞ of G S, said curve meeting all the requirements above given. These proportions, as above described, will run true and are interchangeable; and, in general terms, polygonal figures of various forms may run true and smooth with each other, due provision being made for the variation of the center distances, provided that no salient angle formed by the straight pitch-lines or bases of any contiguous tooth and space shall be more acute than those of a ten-toothed pinion, and provided that no re-entering angle formed by the straight pitch-lines or bases of any contiguous tooth and space shall be more acute than four times the corresponding angle of the tooth and space that are to engage with them. From this we may deduce the following: In internal gear of the standard contour, as described, the pinion or smaller wheel will run in any internal gear of the same pitch, and not less than four times its own pitch diameter, and this will hold good of both spur and bevel gear. In especial cases of internal gear, where it is desired to use a gear in another of less than four times its own diameter, whether spur or bevel, the expansion described of H I H′ I′ should be increased to the degree that the proportions of the gear in question differ from the standard of four to one, and the result will run with a degree of perfection equal to the standard, but will not be interchangeable therewith; hence such especial patterns are to be considered only as a dernier resort. In elliptic gear, the ellipse being treated as a polygon and the teeth and spaces laid out as above mentioned, the center line of each tooth or space being perpendicular to the side of the polygon at the point where it is tangent to the curve of the pitch-line, the wheels will run perfectly, either with similar or with plain spur-gear, whether the gear run eccentric or concentric, due provision being made as regards center distances. Note, that the degree of eccentricity allowable reaches its maximum when the center of motion is in one of the foci of the ellipse, or when the degree of eccentricity is equal to one-half of the base of a right-angled triangle of which the perpendicular equals the breadth of the ellipse and the hypoteneuse equals its length. The ellipse should never in its smallest part be less in radius than the standard ten-tooth pinion. In this elliptic gear it will be found that the center lines of the teeth and spaces will be true radii of the ellipse, not ranging for the common center or intersection of the transverse and conjugate diameters, but cutting the line of centers from focus to focus, each in the same point that a line dropped from a corresponding point on said ellipse, when described upon the surface of a cylinder, (whose diameter is equal to the breadth of the ellipse,) would strike the center line of the same, and the length of said center line gives the focal length of the ellipse. In all of the above-mentioned cases the shaft-centers or centers of revolution are in one plane, whether parallel, as in spur-gear, or at an angle, as in bevels. But another class of especial cases arises when the centers of motion are not in the same plane, as when the shafts pass but do not touch each other. The extreme of these cases is found when the two shafts lie in planes that are at right angles to each other. When the gear, if of those known as spiral, takes the standard contour, as described, on the section at right angles to the flank of tooth and space, or, in other words, on the pitch-circle, the standard contour is corrected, as a joiner "rakes a molding" to the degree of the angle of the spiral and shaft center; or by the difference between the base and hypotenuse of a right-angled triangle whose angle contained between the base and hypotenuse is equal to the angle formed by the spiral and center of motion. These teeth may be cut correctly and perfectly by the same cutters used for spur-gear. In these cases the teeth of all the different degrees of spiral are found in the same manner, and a certain degree of interchangeability may be attained. In the other extreme case of the worm-gear the worm takes the standard contour at right angles to the flank of the thread, which in this case agrees with the pitch of the screw, and the gear takes the same, both being corrected as in the case of spirals above. In these interchangeability is limited to the capability of the worm to drive gear of any number of teeth not below the standard of ten. In all of these cases assume two straight cylinders of diameter equal to the diameters of the gear at the point where the shaft-centers are at their minimum distance, plus twice the length of the tooth used, and consider these cylinders engaged till their pitch diameters or circles touch, their centers lying at the angle required by the case. Then the space in each of the imaginary cylinders that passes within the surface of the other one, when the first is revolved, shows just how much space that gear may use to advantage, since either cylinder contains all that can be run at the rates of speed obtaining between the top of the tooth and bottom of the space, and it is obvious that anything running faster or slower than these limits is an imperfection and a detriment. Thus in worm-gear the face of the tooth should never curve and follow around the bottom of the worm, lest it cause the space to undercut and weaken the tooth in the center; also, it causes both worm and gear to wear unnecessarily and irregularly.

Having thus described the nature and uses of my invention, that which I claim, and desire to secure by Letters Patent, is—

1. The tooth for gear of all descriptions, having its sides from the pitch-line outward formed on a cycloidal curve, and constructed on the center line of the tooth, combined with the space having the same curved sides, (reversed,) and constructed on the center line of said space, all constructed and operating substantially as and for the purposes above set forth.

2. The tooth for gearing, constructed with the curve of the hypercycloid, as described, substantially as and for the purposes set forth.

3. In the art of manufacturing the teeth of gearing, the method described, consisting of laying out the teeth and spaces on the described polygon, of number of sides equal to the whole number of teeth and spaces, substantially as above described.

4. In the art of manufacturing gearing whose teeth and spaces are made on cycloidal curves, the method described, consisting of separating the curves and inserting space to give the full size required, substantially in the manner and for the purposes above set forth.

ALOHA VIVARTTAS.

Witnesses:
EDWARD HUGHES,
AUGUSTUS BOTTGER.